United States Patent
Wang et al.

(10) Patent No.: US 8,498,338 B1
(45) Date of Patent: Jul. 30, 2013

(54) MODE DECISION USING APPROXIMATE ½ PEL INTERPOLATION

(75) Inventors: Shih-Hao Wang, Beimen Township, Tainan County (TW); Leslie D. Kohn, Fremont, CA (US); Tihao Chiang, Fremont, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 13/585,091

(22) Filed: Aug. 14, 2012

Related U.S. Application Data (63) Continuation of application No. 11/300,185, filed on Dec. 14, 2005, now Pat. No. 8,265,151.

(51) Int. Cl.
*H04N 7/12* (2006.01)

(52) U.S. Cl.
USPC ............ 375/240.13; 375/240.12; 375/240.16; 375/240.17; 375/240.01; 375/240

(58) Field of Classification Search
USPC ............. 375/240.13, 240.12, 240.16, 240.17, 375/240.01, 240
See application file for complete search history.

(56) References Cited

U.S. PATENT DOCUMENTS

| | | | |
|---|---|---|---|
| 5,469,517 A * | 11/1995 | Ohta | 382/252 |
| 6,167,088 A | 12/2000 | Sethuraman | 375/240.1 |
| 2002/0064228 A1 | 5/2002 | Sethuraman et al. | 375/240.12 |
| 2003/0112864 A1 | 6/2003 | Karczewicz et al. | 375/240.01 |
| 2003/0194011 A1 | 10/2003 | Srinivasan | 375/240.17 |
| 2004/0062307 A1 | 4/2004 | Hallapuro et al. | 375/240.13 |
| 2004/0213345 A1 | 10/2004 | Holcomb et al. | 375/240.03 |
| 2005/0201463 A1 | 9/2005 | Lee et al. | 375/240.16 |
| 2006/0088104 A1 | 4/2006 | Molloy et al. | 375/240.17 |
| 2006/0126734 A1 | 6/2006 | Wiegand et al. | 375/240.12 |
| 2006/0291557 A1 | 12/2006 | Tourapis | 375/240.12 |

* cited by examiner

*Primary Examiner* — Benny Q Tieu
*Assistant Examiner* — Martin Mushambo
(74) *Attorney, Agent, or Firm* — Christopher P. Maiorana, PC (57) ABSTRACT

A method for video encoding is disclosed. The method generally includes the steps of (A) generating first sub-pel data for at least one of (i) a motion estimation and (ii) a mode decision by first filtering reference data and (B) generating second sub-pel data for a motion compensation by second filtering the reference data. Wherein a first performance of the first filtering may be different than a second performance of the second filtering.

16 Claims, 7 Drawing Sheets

FIG. 7

MODE DECISION USING APPROXIMATE ½ PEL INTERPOLATION

This is a continuation of U.S. Ser. No. 11/300,185, filed Dec. 14, 2005 now U.S. Pat. No. 8,265,151, which is incorporated by reference.

FIELD OF THE INVENTION

The present invention relates to a method and/or architecture for video encoding generally and, more particularly, to a set of approximate half-pel interpolation methods for mode decision, motion estimation and/or motion compensation.

BACKGROUND OF THE INVENTION

In a conventional video encoder, a mode decision module and a motion estimation module use a same pixel interpolation scheme as a motion compensation module to ensure that all modules operate synchronously. Several long interpolation filters have been adopted in the recent International Organization for Standardization (ISO) Moving Picture Experts Group (MPEG) Standards and International Telecommunications Union-Telecommunications Standardization Sector (ITU-T) H.26x standards for aliasing reduction. The use of long filters result in significant increases for memory storage and computational complexity.

The recent ISO MPEG standards and ITU H.26x standards adopt finer motion resolution than previous half-pel motion vectors to reduce prediction errors and to achieve better coding performance. Unlike MPEG-2 or H.263, MPEG-4 and H.264 (MPEG-4 AVC) use 8-tap or 6-tap Wiener interpolation filters to get more than 1 dB gain using motion vectors of quarter-pel resolution and to reduce aliasing effects. For the half-pel interpolation, the long Wiener filter can provide better low pass characteristics than a bilinear filter with reduced aliasing effects of the interpolated frame. Although the coding efficiency is enhanced by the longer filters, the operational complexity increases with the number of filter taps.

To balance the performance and the computational complexity, some conventional solutions modify the motion compensation using fewer taps of an interpolation filter. A conventional proposed approach uses a 4-tap interpolation filter for motion compensation to trade reduced memory accesses for minor drifting errors. To adaptively adjust memory usage for motion compensation, another proposed approach uses three different types of interpolation filters (i.e., 2-tap, 4-tap and 6-tap) according to the frame and macroblock coding type. When B-frame or smaller blocks are used, the 2-tap or the 4-tap filter is applied to reduce the memory overhead in the interpolation process. Although the memory bandwidth is reduced, the reconstructed frame will result in mismatches between the encoder and decoder. As such, the longer the intra frame period runs, the greater the degree of mismatch propagation.

SUMMARY OF THE INVENTION

The present invention concerns a method for video encoding. The method generally comprises the steps of (A) generating first sub-pel data for at least one of (i) a motion estimation and (ii) a mode decision by first filtering reference data and (B) generating second sub-pel data for a motion compensation by second filtering the reference data. Wherein a first performance of the first filtering may be different than a second performance of the second filtering.

The objects, features and advantages of the present invention include providing a set of approximate half-pel interpolation methods for mode decision, motion estimation and/or motion compensation that may (i) reduce circuit complexity compared with conventional designs, (ii) minimize error propagation problems due to mismatched interpolation filtering, (iii) maintain a performance similar to conventional techniques and/or (iv) reduce a circuit capacitance switching power with less frequent switching.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention is generally related to the field of digital video signal processing, and more particularly to an architecture of an approximation for complicated sub-pel interpolation process for a motion estimation and an inter-frame rate-distortion cost calculation in a mode decision module. Interpolation methods in each module (e.g., a motion estimation module, a motion compensation module and a mode decision module) of an encoder may be decoupled from each other so that a circuit complexity is reduced while maintaining similar performance. In particular, the mode decision module and the motion estimation module may adopt a more efficient architecture and shorter filters, albeit not synchronized with the motion compensation module. The interpolation complexity of a half-pel interpolation may be reduced by approximating the original long taps (e.g., >2 taps) of a Finite Impulse Response (FIR) filter with a "short" filter. The present invention generally includes a set of filter design approaches and architectures to approximate the results achieved by long interpolation filter consuming less memory storage than conventional approaches. Furthermore, an error propagation problem due to mismatched interpolation filters between the encoder and a decoder, may be reduced using a long filter for the motion compensation and one or more short filters for the mode decision and/or the motion estimation. Using the original filter taps (e.g., decoder filter taps) for motion compensation generally results in no error propagation (e.g. drift). Using shorter taps of the filters for motion estimation and the mode decision may cause some sub-optimal results.

Figure 1:
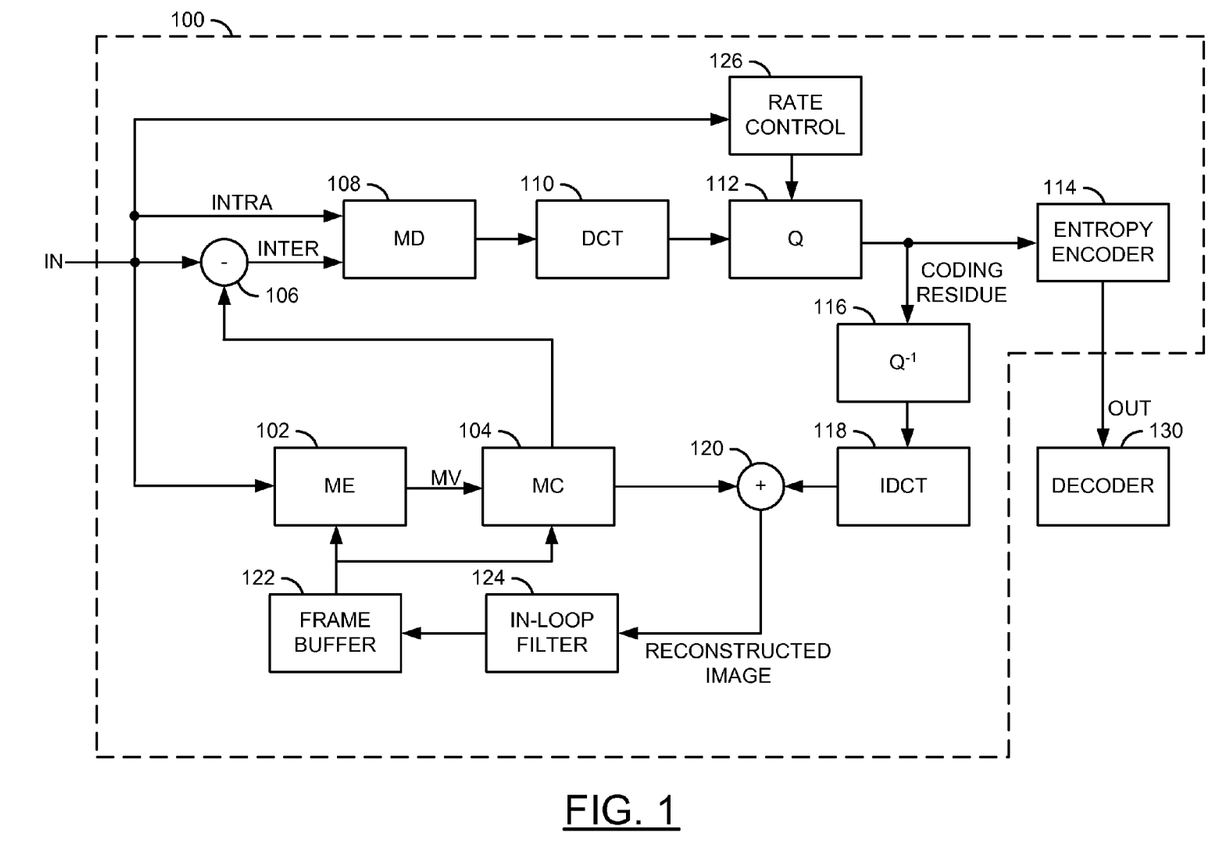
FIG. 1 is a functional block diagram of an example implementation of a system in accordance with a preferred embodiment of the present invention.

Referring to FIG. 1, a functional block diagram of an example implementation of a system 100 is shown in accordance with a preferred embodiment of the present invention.

The system (or apparatus) may be referred to as a video encoder system. The video encoder system 100 is generally operational to encode video sequences received in an input signal (e.g., IN) to generate a standard-compliant bitstream (e.g., a signal OUT). The signal IN may be compliant with a Consultative Committee for International Radio (CCIR) standard CCIR-601, a CCIR-656 standard, an RGB video input standard or the like. The bitstream OUT may be compliant with compression standards such as ISO MPEG-1/2/4, the ITU H.26x standards or the like.

The video encoding circuit 100 generally comprises a motion estimation (ME) module (or operation) 102, a motion compensation (MC) module (or operation) 104, a difference module (or operation) 106, a mode decision module (or operation) 108, a discrete cosine transform (DCT) module (or operation) 110, a quantization (Q) module (or operation) 112, an entropy encoder module (or operation) 114, an inverse quantization ($Q^{-1}$) module (or operation) 116, an inverse DCT module (or operation) 118, a summation module (or operation) 120, a frame buffer module (or operation) 122, an optional filter module (or operation) 124 and an optional rate control module (or operation) 126. Pictures (e.g., fields and/or frames) received in the signal IN may be encoded using either intra-coding or inter-coding. A decoder 130 may receive the encoded bitstream OUT. The modules 102-126 may be implemented in hardware and/or software executing on one or more processors. The conventional operations of each of the modules 102-128 and the decoder 130 are know to those skilled in the art and thus will not be described in detail. Non-conventional operations of the modules may be described in detail as follows.

To improve an inter-coding performance, the video encoder system 100 generally adopts a fine motion search resolution, such as half-pel, quarter-pel and optionally finer sub-pel (e.g., eighth-pel) resolutions. The fine motion search resolution generally (i) improves search precision compared with a coarse resolution search and (ii) reduces a prediction error to achieve better coding performance. For example, a 2-tap bilinear Finite Impulse Response (FIR) filter may be used for a half-pel interpolation used in motion estimations in MPEG-1 and MPEG-2. Longer filters generally reduce upsampling aliasing effects and may introduce only relatively minor transform errors. In an MPEG-4 Advanced Simple Profile (ASP) standard and the H.264 standard, the half-pel precision pixel data may be generated using an 8-tap FIR filter and a 6-tap FIR filter, respectively, to reduce aliasing effects.

For MPEG-4, block sizes used for motion compensation generally have two types, 8×8 pixels and 16×16 pixels. The 8-tap FIR filter generally uses 3 and 4 extra pixels on a left side and a right side, respectively, of the current macroblock to perform half-pel horizontal interpolation. The same condition is true for vertical edges, which generally means an extra 7 pixels may be used for horizontal and vertical edges compared with the 6-tap FIR filter. As such, 15×15 pixels may be used for the half-pet interpolation of an 8×8 block and 23×23 pixels may be used for the half-pel interpolation of a 16×16 block. The resulting overheads are approximately 251% and 106%, respectively, of the block size being interpolated.

For H.264, similar issues occur as with MPEG-4. In H.264, the encoder generally adopts 7 types of search block sizes from 4×4 pixels to 16×16 pixels. Though the H.264 FIR filter may be 2 taps shorter than MPEG-4, the increased number of various block sizes generally poses greater challenges. In a worst case, the total data operated across may be significantly greater than search schemes without sub-pel interpolation.

Conventional software solutions use frame level sub-pel interpolation to reduce redundant processing that overlaps in several macroblocks and several block sizes. The conventional software solutions will use 4 times and 16 times of original image size to store half-pel interpolated and quarter-pel interpolated images, respectively. For example, if a D1 resolution (720×480 pixels) is used, then 1.35 megabytes are consumed storing each half-pel resolution image and 5.4 megabytes are used to store each quarter-pel resolution image. For the high definition 720-progressive and 1080-progressive cases, a respective 14.4 megabytes and 31.64 megabytes of storage is consumed on the sub-pel interpolation data. Such storage sizes are impractical for hardware realization, especially for portable devices in mobile applications.

The ME module 102 may be operational to compute motion vectors (e.g., MV) in an integer resolution and/or a sub-pel resolution. The MD module 108 may be operational to compute both intra-coding costs and inter-coding costs, with the lower of the costs being used. The MC module 104 may be operational to reconstruct the original pictures from encoded representations of the pictures.

If the motion estimation conducted by the ME module 102 generates a motion vector pointing off the integer pel locations, both the MD module 108 and the MC module 104 may use sub-pel pixel data generated through sub-pel interpolation. The motion compensation may use the sub-pel interpolation only when sub-pel motion vectors are encoded. Once a sub-pel motion vector is encoded, the interpolation used by the MC module 104 generally follows the coding standards to avoid error propagation between the video encoder system 100 and the decoder 130 in generating the reconstructed reference pictures. In some embodiments, each of the ME module 102, the MC module 104 and the MD module 108 may perform individual internal interpolations substantially simultaneously such that all of the filters work on a same set of pixel data at the same time. In other embodiments, the individual interpolations may be performed at different times such that only one or a sub-set of the filters are operating at any given time. In some embodiments, interpolated data may be generated by one of the modules and shared with other modules. For the ME module 102 and the MD module 108, a mismatched interpolation process generally results in suboptimal motion vectors and coding modes that may lead to less coding efficiency as a trade for lower complexity.

Two approaches may be used for the mode decision between inter coding and intra coding. In the first approach, the inter cost calculated by the ME module 102 may be used directly for the mode decision. If so, the MD module 108 may optionally not perform a separate interpolation of the pixel data (e.g., $N_1$ taps=$N_2$ taps in FIG. 5). In the second approach, the MD module 108 may interpolate the data to generate a more precise inter cost (e.g., the ME module 102 and the MD module 108 each perform a different interpolation).

Figure 2:
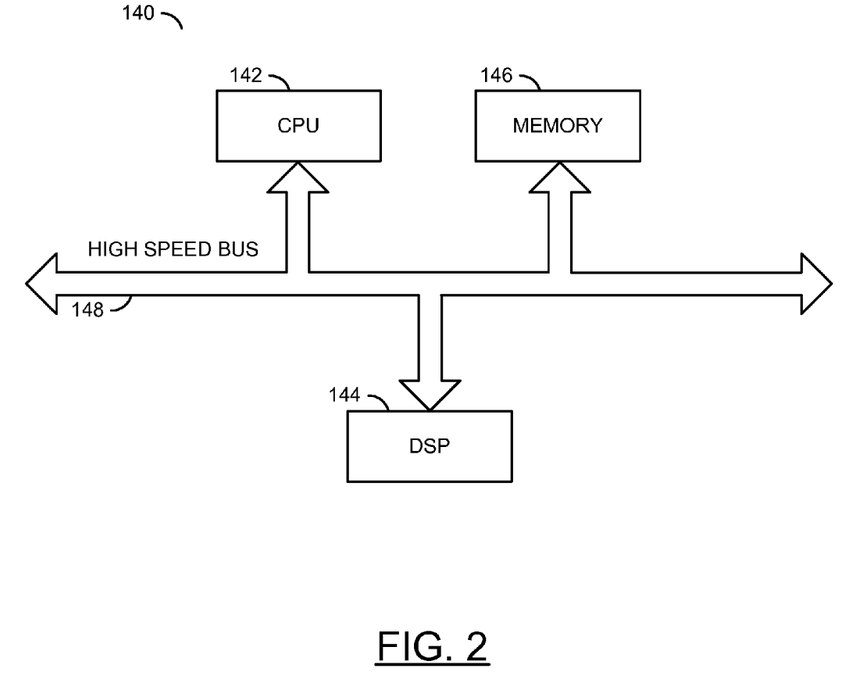
FIG. 2 is a block diagram of an example hardware architecture of a video encoder system.

In some embodiments, the video encoder system 100 may implement approximated half-pet interpolation for both the motion estimation operations and the mode decision operations. Referring to FIG. 2, a block diagram of an example hardware architecture 140 of a video encoder system is shown. The hardware architecture 140 generally comprises a central processing unit (CPU) 142 for control signal management, a digital signal processor (DSP) 144 for multimedia instruction acceleration and a memory 146 for storing data. The CPU 142, the DSP 144 and the memory 146 may be in communication with each other via a high speed bus 148.

The frame buffer 122 operation (FIG. 1) may be implemented by the memory 146. Other operations, such as the motion estimation operation, the mode decision operation and the motion compensation operation may be implemented as software modules executed by the hardware (e.g., CPU 142 and/or DSP 144) and/or by dedicated hardware modules.

The motion estimation module 102, the mode decision module 108 and the motion compensation module 104 may consume about 50-90% of the total encoder operations. An optimization of the encoder operations may be a function of multiple (e.g., two) parameters: (i) computational complexity and (ii) quality loss. Therefore, some quality loss of the encoded pictures may be traded for lower complexity of the interpolation process.

The hardware architecture 140 generally implements a combination of one or more various interpolation filters with different taps for the motion estimation interpolation, the mode decision interpolation and the motion compensation interpolation. With the different filter combinations, a design with a best tradeoff point between computational complexity and quality loss may be determined.

Figure 3:
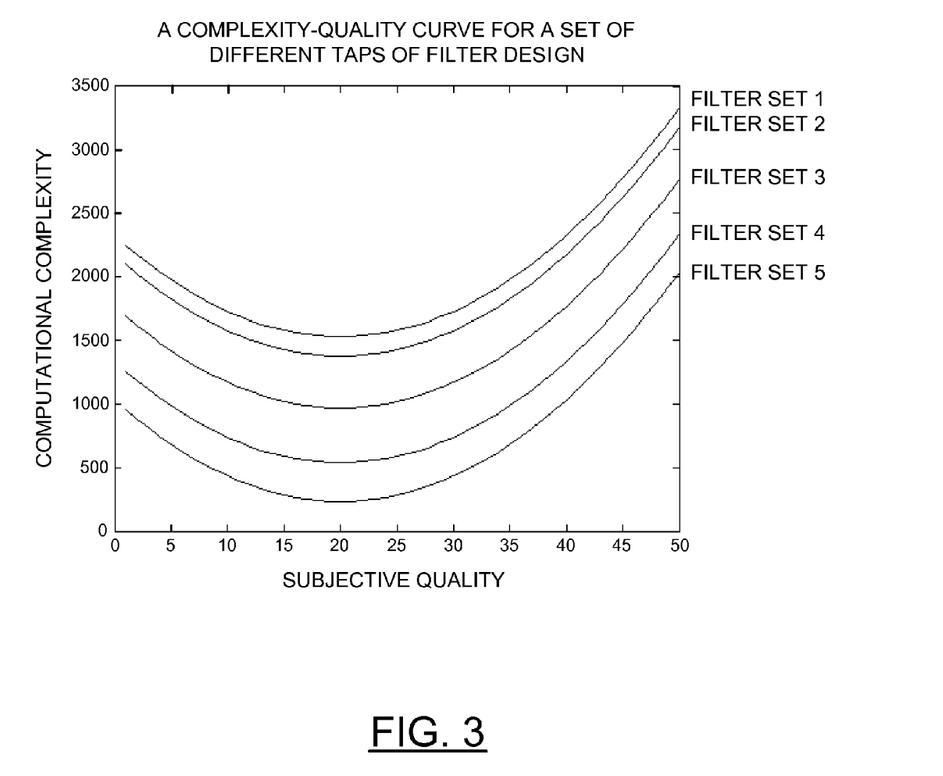
FIG. 3 is a graph of example solutions for a 2-dimension design space.

Referring to FIG. 3, a graph of example solutions for a 2-dimension design space is shown. Multiple (e.g., five) curves are illustrated generally showing computational complexity as a function of subjective quality for several different filter set implementations. The graph generally illustrates that computational complexity of the encoding process may have an optimal (e.g., minimal computational complexity) around a specific range of encoding quality. A best tradeoff generally occurs at a point with a minimal quality loss for a given computational complexity.

Figure 4:
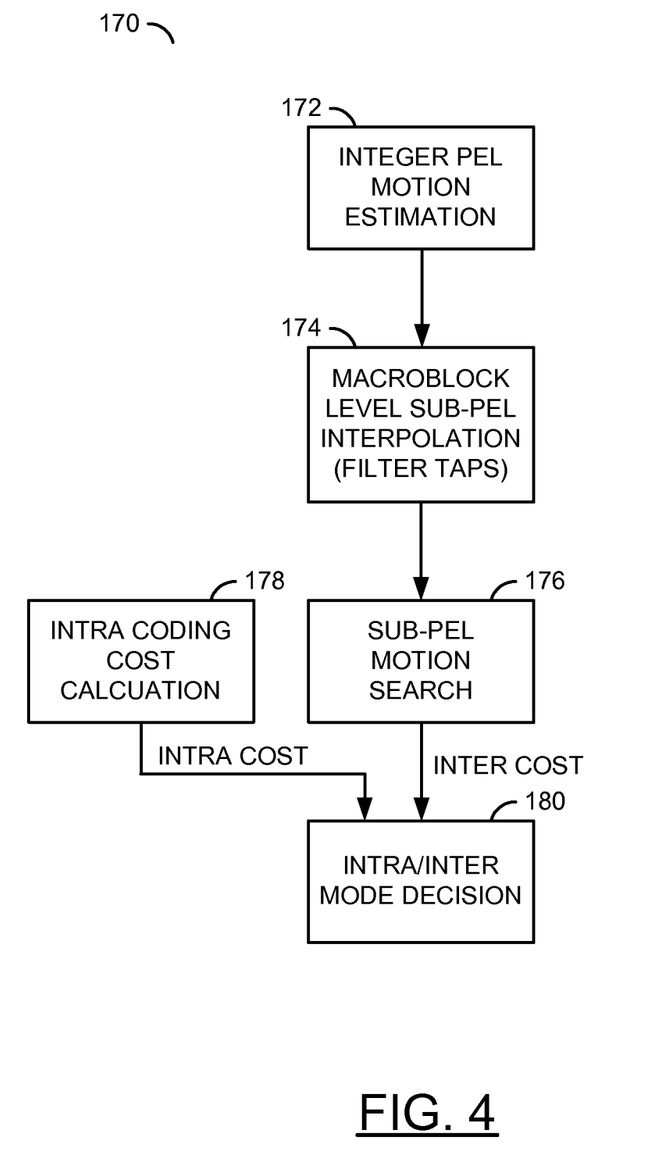
FIG. 4 is a flow diagram of an example method for on-the-fly interpolation.

Referring to FIG. 4, a flow diagram of an example method 170 for on-the-fly interpolation is shown. The method (or process) 170 generally comprises a step (or block) 172, a step (or block) 174, a step (or block) 176, a step (or block) 178 and a step (or block) 180.

The ME module 102 may perform an integer pel motion estimation in the step 172 to identify a motion vector for a block. The ME module 102 may then perform a sub-pel interpolation for a given search window in the step 174. A sub-pel motion search may be conducted by the ME module 102 in the step 176 using the sub-pel pixel data generated by the interpolation. Results of the sub-pel motion estimation may be used as a basis for an inter-coded cost (e.g., INTER COST). In step 178, an intra-coded cost (e.g., INTRA COST) may be calculated by the MD module 108 based on the integer pixel data. The MD module 108 may then compare the two costs in the step 180. The lower of the costs may be used to control the subsequent encoding of the macroblock data.

Figure 5:
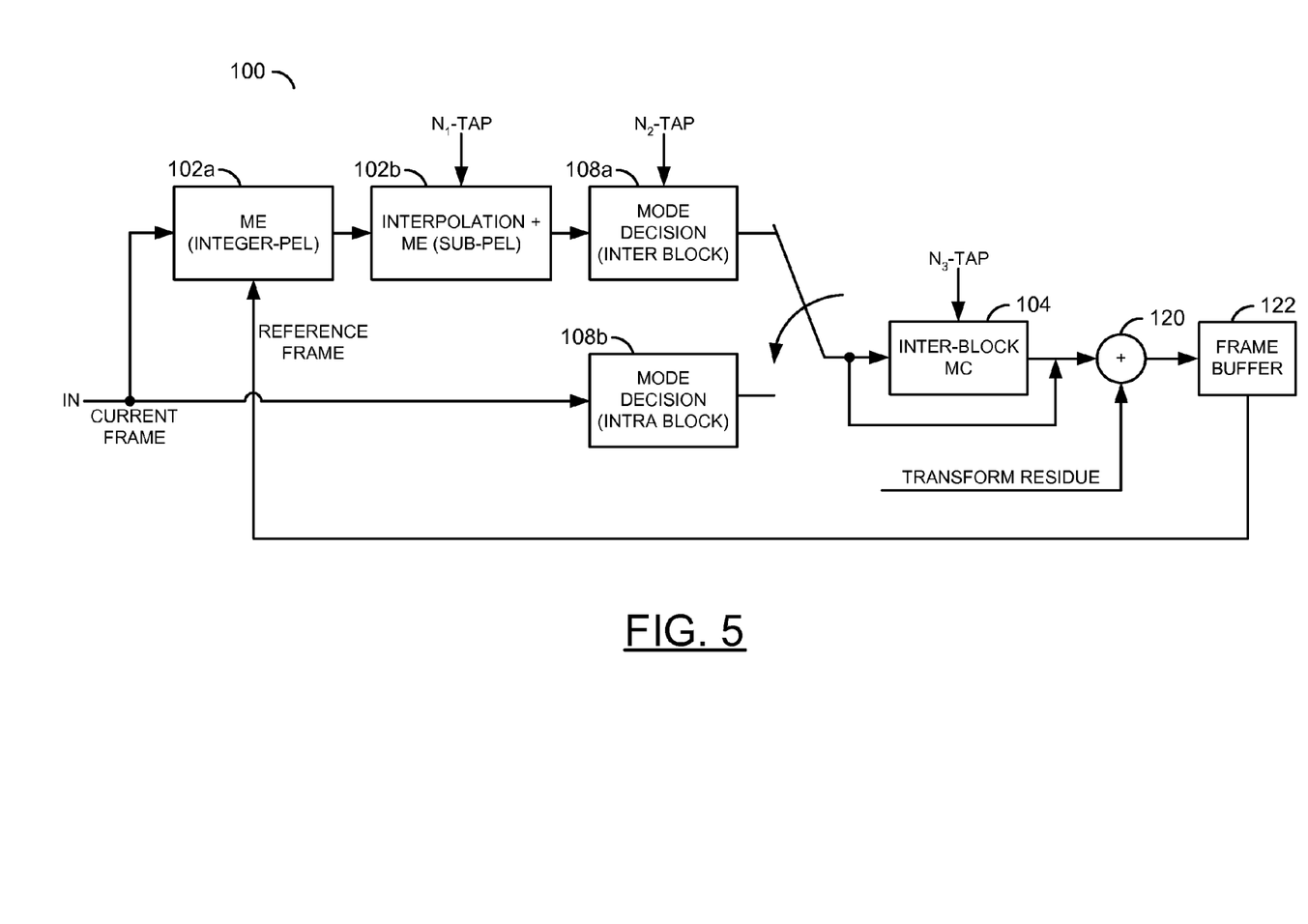
FIG. 5 is a detailed functional block diagram of a portion of the video encoder circuit.

Referring to FIG. 5, a detailed functional block diagram of a portion of the video encoder circuit 100 is shown. The motion estimation module 102 may be divided into an integer-pel motion estimation module 102a and a sub-pel motion estimation module 102b. The mode decision module 108 may be divided into an inter-block mode decision module 108a and an intra-block mode decision module 108b.

To achieve a lower computation complexity, a set of shorter (e.g., <6 taps) FIR filters may be implemented for the sub-pel interpolation of sub-pet pixels used in the motion estimation module 102b and the inter-block mode decision module 108a. The video encoder system 100 generally uses a number $N_1$ of taps for the sub-pel motion estimation, a number $N_2$ of taps for the inter-block mode decision and a number $N_3$ of taps for the motion compensation. To avoid drifting errors, the value of $N_3$ is usually set to the conventional taps, although not always. An example of using separable 1D 2-tap and 4-tap filters with filter coefficients for H.264 may be as follows:

1D 2 taps separable filter coefficients: [1 1]/2

1D 4 taps separable filter coefficients: [−1 5 5 −1]/8

Figure 6:
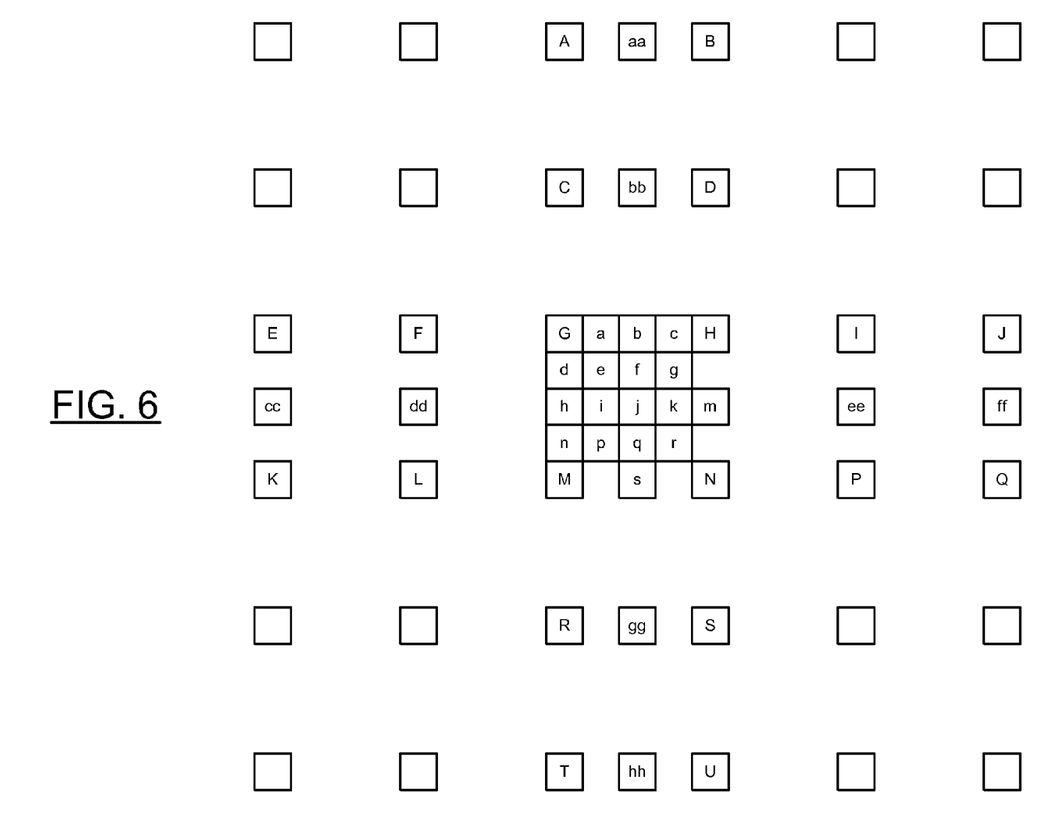
FIG. 6 is a drawing generally showing integer pel, half-pel and quarter-pel locations.

Referring to FIG. 6, a block diagram of a pixel location layout is shown to detail an example interpolation process for the 2-tap filter. The upper-case letters in FIG. 6 generally represent the integer pel positions. The lower-case letters generally represent the sub-pel positions. Calculations for the half-pel pixels may be as follows:

$$b=(G+H)\gg\geq 1$$

$$h=(G+M)\gg\geq 1$$

$$s=(M+N)\gg\geq 1$$

$$m=(H+N)\gg\geq 1$$

$$j=(b+s)\gg\geq 1$$

Calculations for quarter-pel pixels may be as follows:

$$a=(3G+H)\gg\geq 2$$

$$c=(G+3H)\gg\geq 2$$

$$d=(3G+M)\gg\geq 2$$

$$n=(G+3M)\gg\geq 2$$

$$f=(3b+s)\gg\geq 2$$

$$i=(h+j)\gg\geq 1$$

$$k=(j+m)\gg\geq 1$$

$$q=(b+3s)\gg\geq 2$$

$$e=(h+b)\gg\geq 1$$

$$g=(b+m)\gg\geq 1$$

$$p=(h+s)\gg\geq 1$$

$$r=(s+m)\gg\geq 1$$

Figure 7:
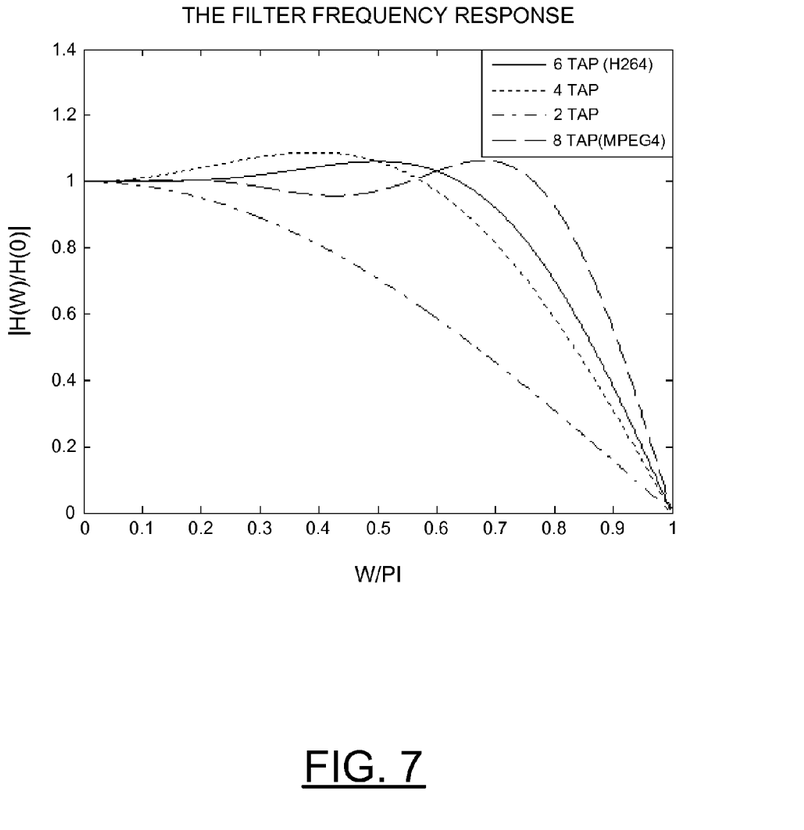
FIG. 7 is a diagram of frequency responses for multi-tap filters.

Referring to FIG. 7, is a diagram of frequency responses for multi-tap filters. The frequency responses generally show characteristics of the multi-tap filters used as pre-upsampling filters. The curves may also demonstrate how the frequency responses in different frequency bands may be used to reduce an aliasing effect. In general, a response of the 4-tap interpolation filter may be quite close to the characteristics of the H.264 6-tap filter. A response to the 2-tap filter may have characteristics slightly worse than an H.264 6-tap filter.

The present invention generally provides an architecture for sub-pel image interpolation used for video compression. Different filters may be used for sub-pel interpolations (including half-pel, quarter-pel, even finer resolution) in the motion estimation function, the mode decision function and the motion compensation function. A first set of filters may be used for sub-pel interpolation in the motion estimation function that results in a near optimal motion vector. A second set of filters is generally used for sub-pel interpolation in the mode decision function. A third set of filters may be used for the final motion compensation function. A combination of reduced complexity filters generally provides minimal loss of coding efficiency and complexity. The various filters in the motion estimation, the mode decision and the motion compensation may be configured so that a best tradeoff point in a design space is found.

The present invention may provide a hardware architecture designed for sub-pel image interpolation used for video compression. The sub-pel image interpolation may use fewer data pixels and a smaller local buffer for the stored data pixels.

The function performed by the functional block diagrams and flow diagrams of FIGS. 1, 4 and 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for encoding a video signal, comprising the steps of:
   (A) generating first sub-pel data used in at least one of (i) a motion estimation and (ii) a mode decision by first filtering reference data;
   (B) generating second sub-pel data used in a motion compensation by second filtering said reference data, wherein
      (i) said first filtering utilizes a first number of a plurality of non-zero taps,
      (ii) said second filtering utilizes a second number of said non-zero taps and
      (iii) said first number is less than said second number;
   (C) generating third sub-pel data used in said mode decision by third filtering of said reference data, wherein a performance of said third filtering is different than both said first filtering and said second filtering,
   wherein said first filtering, said second filtering and said third filtering are performed in parallel; and
   (D) compressing said video signal by inter-coding based on said motion estimation.

2. The method according to claim 1, wherein a performance of said second filtering matches third filtering used in said motion compensation in a video decoder to minimize drift.

3. The method according to claim 1, wherein said first filtering and said second filtering are performed in parallel.

4. The method according to claim 1, wherein a first sub-pel resolution of said first filtering used in said motion estimation matches a second sub-pel resolution of said second filtering used in said motion compensation.

5. The method according to claim 1, wherein said first sub-pel data is used in both (i) said motion estimation and (ii) said mode decision.

6. The method according to claim 1, further comprising the step of:
   starting an integer pel search before generating said first sub-pel data used in said motion estimation.

7. The method according to claim 1, wherein a resolution of said first filtering used in said motion estimation comprises a half-pel resolution.

8. The method according to claim 1, further comprising the step of:
   generating an encoded bitstream compliant with at least one of an International Organization for Standardization/International Electrotechnical Commission 14496-10 standard and an International Telecommunication Union-Telecommunications Standardization Sector Recommendation H.264.

9. An encoder circuit comprising:
   at least one processor configured to
      (i) generate first sub-pel data used in at least one of (a) a motion estimation and (b) a mode decision by first filtering reference data,
      (ii) generate second sub-pel data used in a motion compensation by second filtering said reference data and
      (iii) compress a video signal by inter-coding based on said motion estimation, wherein
         (i) said first filtering utilizes a first number of a plurality of non-zero taps,
         (ii) said second filtering utilizes a second number of said non-zero taps and
         (iii) said first number is less than said second number,
      wherein (i) said mode decision uses a third sub-pel data generated by third filtering said reference data and (ii) a performance of said third filtering is different than both said first filtering and said second filtering,
      wherein said first filtering, said second filtering and said third filtering are performed in parallel.

10. The encoder circuit according to claim 9, wherein a performance of said second filtering matches third filtering used in said motion compensation in a video decoder to minimize drift.

11. The encoder circuit according to claim 9, wherein said first number is no greater than two of said non-zero taps.

12. The encoder circuit according to claim 9, wherein said first number is no greater than four of said non-zero taps.

13. The encoder circuit according to claim 9, wherein said first sub-pel data used in said mode decision comprises half-pel data.

14. The encoder circuit according to claim 9, wherein said second number is at least six of said non-zero taps.

15. A circuit for video encoding comprising:
   means for generating first sub-pel data used in at least one of (i) a motion estimation and (ii) a mode decision by first filtering reference data;
   means for generating second sub-pel data used in a motion compensation by second filtering said reference data, wherein (i) said first filtering utilizes a first number of a plurality of non-zero taps, (ii) said second filtering utilizes a second number of said non-zero taps and (iii) said first number is less than said second number;
   means for generating third sub-pel data used in said mode decision by third filtering of said reference data, wherein a performance of said third filtering is different than both said first filtering and said second filtering,
   wherein said first filtering, said second filtering and said third filtering are performed in parallel; and
   means for compressing a video signal by inter-coding based on said motion estimation.

16. The method according to claim 1, wherein said second number is at least six of said non-zero taps.

* * * * *